(12) United States Patent
Ishigaki et al.

(10) Patent No.: US 6,546,945 B2
(45) Date of Patent: Apr. 15, 2003

(54) ELECTROMAGNETIC VALVE (75) Inventors: Satoshi Ishigaki, Kariya (JP);
Hiroyoshi Murakami, Obu (JP);
Hideki Okuda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/891,397

(22) Filed: Jun. 27, 2001

(65) Prior Publication Data
US 2002/0000529 A1 Jan. 3, 2002

(30) Foreign Application Priority Data
Jun. 29, 2000 (JP) .......................... 2000-195504
Jan. 12, 2001 (JP) .......................... 2001-004890

(51) Int. Cl.$^7$ ............................................ F16K 31/06
(52) U.S. Cl. ................... 137/15.18; 251/129.15
(58) Field of Search ............... 251/129.15, 129.01; 137/15.18

(56) References Cited
U.S. PATENT DOCUMENTS
5,538,220 A * 7/1996 LaMarca ................ 251/129.15
6,003,839 A * 12/1999 Kobayashi ............. 251/129.15

FOREIGN PATENT DOCUMENTS
JP        9-170675        6/1997

* cited by examiner

Primary Examiner—Kevin Lee
(74) Attorney, Agent, or Firm—Nixon & Vanderhye P.C.

(57) ABSTRACT

A fluid controlling electromagnetic valve is formed by mechanically fixing one axial end portion of a stator core to an annular portion of a yoke, after the primary molding of a coil bobbin, and by sandwiching flanges of the coil bobbin having a coil wound by a predetermined number of turns around the outer circumference of a guide portion, between the rear end face of the annular portion of the yoke and front end face of an annular magnetic plate. A secondary molding is performed including a piece for regulating the axial moving distance of a valve member, to mold a housing of the fluid controlling electromagnetic valve.

19 Claims, 9 Drawing Sheets

ELECTROMAGNETIC VALVE

CROSS REFERENCE TO RELATED APPLICATION

This application is based on and incorporates herein by reference Japanese Patent Application Nos. 2000-195504 filed on Jun. 29, 2000, and 2001-4890 filed on Jan. 12, 2001.

BACKGROUND OF THE INVENTION

1. Field of the Invention

The present invention relates to a fluid controlling electromagnetic valve for adjusting the flow rate of control fluid, suitable for use in a vehicle.

2. Description of Related Art

In most of the fluid controlling electromagnetic valves of the prior art disclosed in JP-A-9-170675, the following assembly method is used when the individual components of the fluid controlling electromagnetic valve is to be assembled. A magnetic circuit is constructed by arranging a magnetic plate made of a magnetic material in advance resin mold integrally with a coil bobbin, and by crimping one end of a stator core made of magnetic material to the inner circumference of a yoke of a magnetic material. These components are held and fixed by resin-molding integrally with a housing.

However, in the fluid controlling electromagnetic valve of the prior art, the magnetic plate is resin-molded in advance integrally with the coil bobbin. Therefore, a molding resin having a predetermined thickness exists in a side gap portion, as formed between the magnetic plate and a moving core. As a result, the radial distance between the magnetic plate and the moving core is elongated to cause a problem that the magnetic efficiency and the responsibility drop.

Further, in the fluid controlling electromagnetic valve of the prior art, the stator core is fitted in the inner circumference of the coil bobbin. The stator core has the leading end portion, with which a piece of a nonmagnetic material is assembled for regulating the axial moving distance of the valve member. Thus, it is impossible to arrange the moving core close to the axial center of the coil. As a result, it is impossible to attain the overlapping portion between the coil and one axial portion of the moving core. Therefore, the axial size of the fluid controlling electromagnetic valve itself is enlarged to cause a disadvantage that the axial structure of the electromagnetic valve is large-sized.

In a conventional electromagnetic valve device for opening/closing the fluid passage, a magnetic circuit includes a moving core, a stator core facing the moving core in the reciprocating directions of the moving core, and a core plate arranged around the outer circumference of the moving core. The moving core is attracted toward the stator core by energizing a coil. By turning ON/OFF the coil, the valve member forming a moving member together with the moving core leaves and is seated on a valve seat to open/close the fluid passage.

Further, a resin film is made of resin material for insert-molding the stator core and the core plate. The resin film is coated on the inner circumference of the core plate, thereby guiding the outer circumference wall of the moving core reciprocally.

SUMMARY OF THE INVENTION

A first object of the present invention is to provide an electromagnetic valve capable of improving the magnetic efficiency and the responsibility.

A second object of the present invention is to provide an electromagnetic valve capable of reducing an axial structure thereof.

A third object of the present invention is to provide an electromagnetic valve device preventing a dispersion of fluid flow rate when the fluid flow rate is low, and which can be small-sized.

According to a first aspect of the present invention, an outer circumference of a moving core and an inner circumference of a magnetic member are arranged close to each other without any molding resin in a radial side gap which is formed between the outer circumference of the moving core facing one axial end face of a stator core and the inner circumference of a magnetic member through an axial air gap. Therefore, it is possible to improve the magnetic efficiency and the responsibility.

According to a second aspect of the present invention, there is provided an electromagnetic valve device in which a guide member arranged at a first stator core at the side facing a moving core and made of a nonmagnetic material guides an inner circumference wall of the moving core reciprocally. Therefore, it is unnecessary to prepare any additional nonmagnetic guide member between a second stator core arranged at the outer circumference of the moving core and the outer circumference wall of the moving core. The gap to be radially formed between the moving core and the second stator core is minimized to increase the magnetic attraction force for attracting the moving core to the first stator core. Thus, it is possible to reduce the number of turns of the coil, thereby reducing the size of the electromagnetic valve.

Where the number of coil turns is not reduced, on the other hand, the magnetic attraction force to attract the moving core increases. Therefore, it is possible to enlarge both the maximum gap between the first stator core and the moving core when the coil is deenergized and the minimum gap between the first stator core and the moving core when a moving member collides against a stopper. Therefore, the minimum gap is located at the position where the magnetic attraction force to attract the moving core axially is not excessively high. Thus, it is possible to lower the velocity for the moving core to collide against the stopper, thereby to reducing the bound of the moving core from the stopper. As a result, the dispersion of the fluid flow rate is reduced even when the valve opening time is so short that the fluid flow rate is low. Further when the bound of the moving core is reduced, it is possible to prevent the reduction of the opening area of the passage. Even at a low fluid flow rate, it is possible to retain a linear relation between the valve opening time and the fluid flow rate.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

A fluid controlling electromagnetic valve 1 of the present embodiment is used in an evaporated fuel evapotranspiration preventing system. This system prevents an evaporated fuel (or an evaporated gas) evaporated and atomized (or volatilized) in a fuel tank 101 of a vehicle such as an automobile from being released into the atmosphere, by introducing (or purging) the evaporated fuel into an intake pipe 103 of an internal combustion engine (e.g., gasoline engine) through a canister 102. Here will be briefly described the evaporated fuel evapotranspiration preventing system with reference to FIG. 1.

Figure 1:
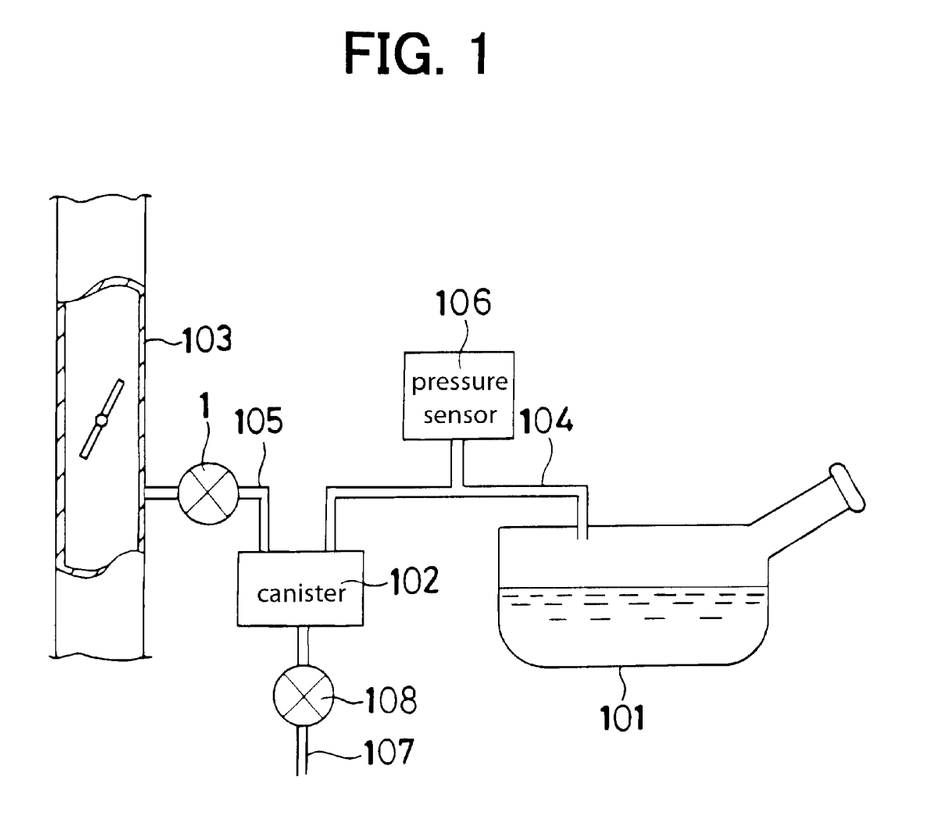
FIG. 1 is a schematic view showing an evaporated fuel evapotranspiration preventing system (first embodiment)

In the evaporated fuel evapotranspiration preventing system, the fuel tank 101 communicates with the canister 102 through a pipeline 104, and the canister 102 communicates with the intake pipe 103 through a pipeline 105. With the pipeline 104, a pressure sensor 106 for detecting a pressure change is connected. In the canister 102, absorber (not illustrated) such as activated charcoal is provided for adsorbing the evaporated fuel.

With the vented hole of the canister 102, moreover, a vented pipeline 107 being vented to the atmosphere is connected. Midway of the vented pipeline 107, a canister control valve 108 is provided. The canister control valve 108 is a normally open type electromagnetic ON/OFF valve for closing the vent hole. Midway of the pipeline 105, the fluid controlling electromagnetic valve (or the purge control valve) 1 is connected for adjusting the purging amount of the evaporated fuel.

Leakage of the evaporated fuel, as evaporated from the fuel tank 101 and the pipelines 104 and 105 communicating with the fuel tank 101, is checked by the following sequence in the evaporated fuel evapotranspiration preventing system. The canister control valve 108 closes the vented pipeline, 107 of the canister 102. Then, negative pressure is introduced from the intake pipe 103 to the pipelines 104 and 105 by opening the fluid controlling electromagnetic valve 1. After that, the evaporated fuel is completely shut off by closing the fluid controlling electromagnetic valve 1. After a predetermined time has passed, the pressure sensor 106 detects whether the pressure has risen or not. In this way, the leakage of evaporated fuel is checked.

Figure 2:
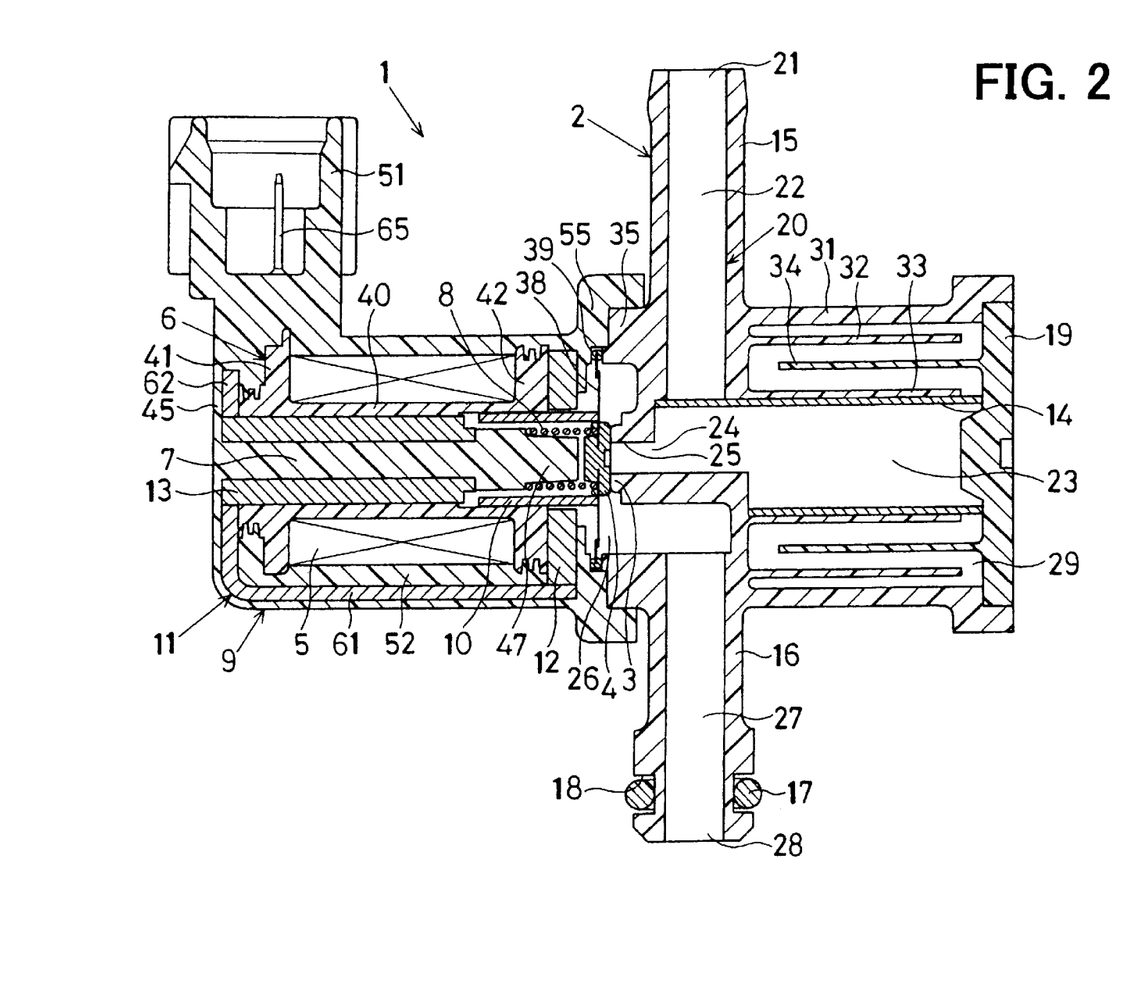
FIG. 2 is a cross-sectional view showing a fluid controlling electromagnetic valve (first embodiment)
Figure 3:
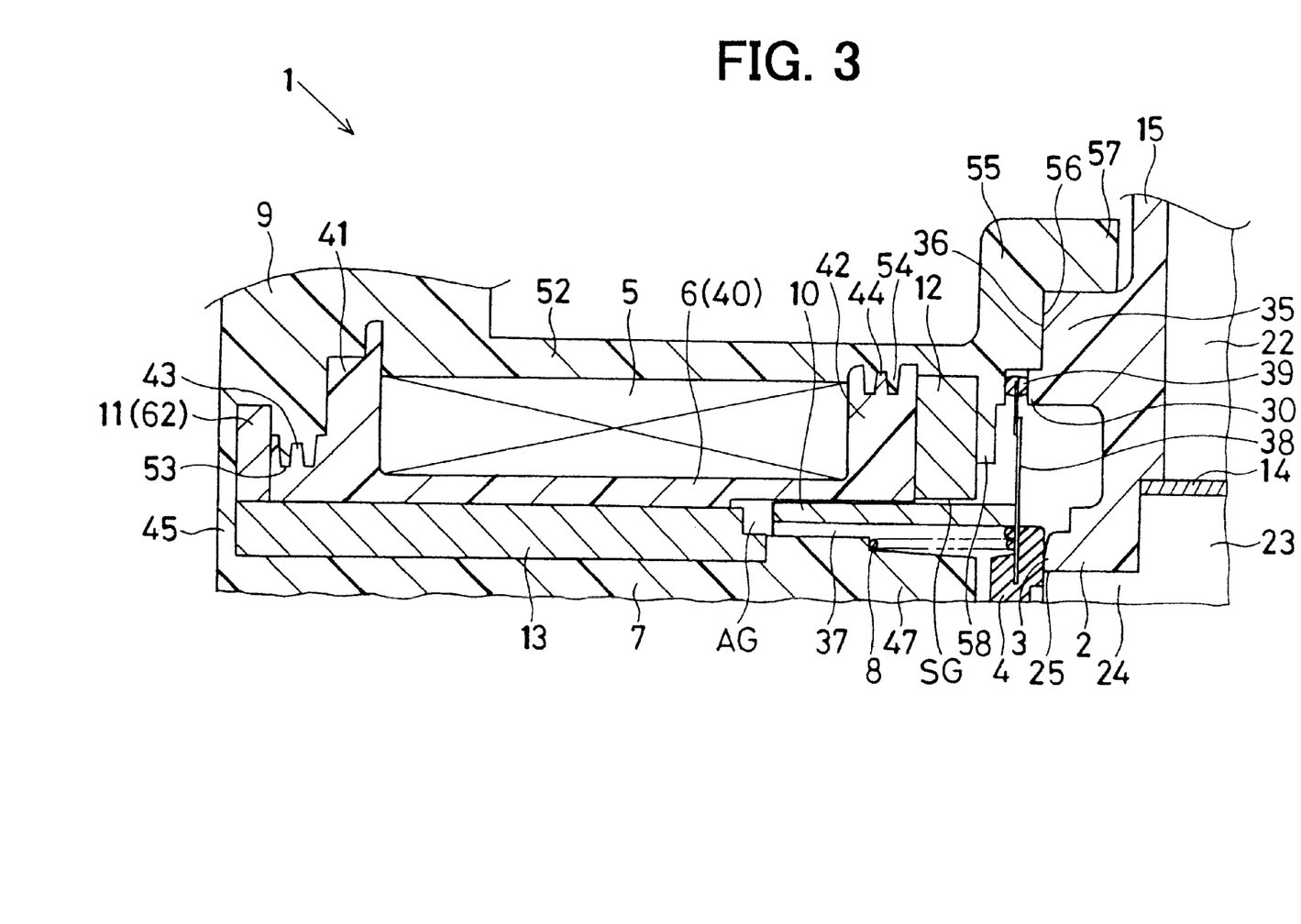
FIG. 3 is a cross-sectional view showing an essential structure of the fluid controlling electromagnetic valve (first embodiment)

The construction of the fluid controlling electromagnetic valve 1 will be explained with reference to FIGS. 1–3. Here, FIG. 2 is a cross-sectional view showing an entire structure of the fluid controlling electromagnetic valve 1, and FIG. 3 is a cross-sectional view showing an essential structure of the fluid controlling electromagnetic valve 1.

The fluid controlling electromagnetic valve 1 is a normally closed type electromagnetic ON/OFF valve. The electromagnetic valve 1 includes a valve member 4 to be seated on and unseated from a valve seat 3 of a seat valve 2, a coil 5 for generating a magnetomotive force when it is energized, a coil bobbin 6 molded integrally of a resin for winding the coil 5 thereon, a piece (regulating member) 7 molded of a resin for regulating the axial displacement of the valve member 4, and a housing 9 made separately from the coil bobbin 6 and resin molded integrally with the piece 7.

In the housing 9, a moving core 10 made of magnetic material is axially movably disposed. In the housing 9, a yoke 11 made of magnetic material, a magnetic plate 12, a stator core 13 made of a magnetic material are held and fixed.

The seat valve 2 is a housing being integrally resin molded of molding resin such as polybutylene terephthalate (PBT) into a predetermined shape for forming a fluid passage 20. The seat valve 2 forms the fluid passage 20 either between itself and the housing 9 or in its inside for allowing a control fluid such as air to flow therethrough. In the fluid passage 20, a cylindrical filter 14 is disposed. The filter 14 allows the control fluid such as air flowing thereinto from an inlet passage 22 to pass therethrough, but traps foreign substance having migrated into the control fluid, to prevent the foreign substance from being introduced into the intake pipe 103.

At the upstream side of the seat valve 2, a tubular inlet pipe 15, which is connected through the pipeline 105 to the canister 102, is integrally molded. At the downstream side of the seat valve 2, a tubular outlet pipe 16, which is connected through the pipeline 105 to the intake pipe 103, is integrally molded. In the outer circumference of the leading end of the outlet pipe 16, an O-ring groove 18 is formed for fitting an O-ring 17 as a seal member for preventing the control fluid from leaking from the clearance between the pipeline 105 and the outlet pipe 16.

Here, the seat valve 2 is opened at the rear axial end face thereof, and a disc-shaped cap 19 is fitted to cover the opening. The cap 19 is integrally molded of a molding resin such as polybutylene terephthalate (PBT). The fluid passage 20 includes an inlet port 21, the inlet passage 22, a chamber 23, a fluid passage 24, a valve port 25, a fluid passage 26, an outlet passage 27, an outlet port 28.

Around the filter 14, a volume 29 is formed for attenuating the pulsations of the control fluid at the time when the valve member 4 is seated on the valve seat 3. Here, the volume 29 is formed to include a cylindrical outer wall 31, intermediate wall 32 and inner wall 33 formed integrally with the rear end face of the seat valve 2, and a cylindrical standing wall 34 formed integrally with front end face of the cap 19 and inserted between the intermediate wall 32 and the inner wall 33.

At axial front end portion (fitted portion 35) of the seat valve 2, an annular fitted face 36 is formed, which is tightly fitted on the axial rear end face of the housing 9. Inside of the fitted face 36, an annular protrusion 30 is formed, which protrudes toward the front end side more than the fitted face 36. The valve seat 3 is formed annularly at the open end of the fluid passage 24, i.e., valve port 25, of the seat valve 2. The valve seat 3 is rearwardly recessed at the axial front end face of the seat valve 2 by a predetermined axial size more than the fitted face 36.

The valve member 4 is made of a rubbery elastomer such as silicone rubber, and a return spring 8 is arranged between the valve member 4 and the piece 7. The valve member 4 is supported by a leaf spring (support member) 38. The leaf spring 38 is arranged to define the internal space formed between the front axial end face of the seat valve 2 and the axial rear end face of the housing 9, into the fluid passage 26 and a spring chamber 37.

The leaf spring 38 is held and fixed at the outer circumference thereof by a packing 39. The packing 39 is sandwiched between the protrusion 30 of the seat valve 2 and the axial rear end face of the housing 9. This packing 39 is made of a rubbery elastomer such as silicone rubber. The return spring 8 acts as bias means for biasing the valve member 4 and the moving core 10 to be seated on the valve seat 3.

The coil 5 is an electromagnetic solenoid for generating a magnetomotive force when it is energized. The coil 5 is formed in a cross-sectional circular shape, and formed by winding it by a predetermined number of turns on the outer circumference of a guide portion 40 of the coil bobbin 6 and by baking-finishing an insulating film made of polyester or the like on the surface of a conductor made of copper or the like. The terminal lead wires of both ends of the coil 5 are electrically connected, by mechanically connecting or welding, to a pair of external connection terminals 65 connecting with an external power source.

The coil 5, the both end lead wires of the coil 5 and the paired terminals 65 are partially insert-molded in the housing 9 so that their connected portions are protected and waterproofed. Here, leading end portions of the paired terminals 65 are exposed from the upper end face of the housing 9 to function as connector pins which are inserted into female connector portions on the side of the external power source to make the electric connections.

The coil bobbin 6 is integrally resin molded by polybutylene terephthalate (PBT) into a predetermined shape, to construct a coil holding member having the cylindrical guide portion 40 for winding and holding the coil 5 on the outer circumference thereof. At the both axial end portions of the guide portion 40, a pair of flanges 41, 42 which protrude radially outwardly from the both end portions of the guide portion 40. These flanges 41, 42 are winding frames for regulating the axial size of the coil 5 when the coil 5 is wound by a plurality of turns around the outer circumference of the guide portion 40. Within the paired flanges 41 and 42, circumferentially formed convex and concave joints 43 and 44 which are to be firmly jointed and held in the inner circumference of the housing 9.

The piece 7 axially extends from a side wall 45, as formed on the axial front end portion of the housing 9, toward the axial rear end side (toward the valve member 4). At the rear end side of the piece 7, a regulating portion 47 is provided for regulating the axial displacement of the valve member 4. The regulating portion 47 protrudes toward the valve member 4 more than the axial rear end face of the stator core 13. The rear end face of the regulating portion 47 is arranged to face the valve member 4 by a predetermined gap. Further, outer periphery of the regulating portion 47 supports an axial front end of the return spring 8.

The housing 9 is integrally resin molded by such as polybutylene terephthalate (PBT) into a predetermined shape. At the upper end area of the side wall 45, a connector shell 51 is integrally resin-molded. The connector shell 51 enhances waterproofing properties by exposing and tightly fitting the connector pins at the leading end portions of the terminals 65 in the female connector portions on the side of the external power source. Within the housing 9, a cylindrical side wall 52 is formed for covering the outer circumferences of the coil and the coil bobbin 6. Inside the both axial end portions of the cylindrical side wall 52, convex and concave joints 53, 54 are formed for being fitted in the convex and concave joints 43, 44 of the coil bobbin 6.

At the axial rear end portion of the cylindrical side wall 52, an outer projection 55 is integrally formed for fitting the fitted portion 35 of the seat valve 2. The axial rear end face of the outer projection 55 is arranged to face the fitted face 36 of the seat valve 2 to provide an annular fitting face 56 for tightly fitting the fitted face 36 of the seat valve 2. From the outer periphery of the outer projection 55, an annular portion 57 protrudes toward the axial rear end side. The annular portion 57 is fitted on the outer periphery of the fitted portion 35 of the seat valve 2. At the inner periphery of the outer projection 55, an annular plate 58 is formed for sandwiching the packing 39 between itself and the protrusion 30 of the seat valve 2. Front end face of the annular plate 58 retains the rear end face of the magnetic plate 12.

The moving core 10 is made of ferromagnetic material into a cylindrical shape and is arranged axially movably in the inner circumferences of the coil bobbin 6 and the magnetic plate 12. The moving core 10 is arranged close to the center of the coil bobbin 6, i.e., to the axial center of the coil 5, and axially and partially laps over the moving core 10 and the coil 5. A predetermined air gap portion (AG) is provided between axial front end face of the moving core 10 and the axial rear end face of the stator core 13. Further, a predetermined side gap portion (SG) is provided between the outer periphery of the moving core 10 and the inner periphery of the magnetic plate 12. The axial rear end face of the moving core 10 is fixed, by joint means such as welding, on the leaf spring 38 holding the valve member 4.

The yoke 11 is made of ferromagnetic material and into a cylindrical shape. The yoke 11 includes a cylindrical portion 61 arranged around the coil 5 and the coil bobbin 6, and an annular portion 62 disposed at axial front end portion of the cylindrical portion 61. The cylindrical portion 61 is insert-molded on the cylindrical side wall 52 of the housing 9. The annular portion 62 is insert-molded on the side wall 45 of the housing 9.

The magnetic plate 12 corresponds to a magnetic member of the present invention. The magnetic plate 12 is made of ferromagnetic material and into an annular disc shape and is arranged to sandwich the coil bobbin 6 between itself and the annular portion 62 of the yoke 11. The magnetic plate 12 is insert-molded between the flange 42 of the coil bobbin 6 and the annular plate 58 of the housing 9. The inner circumference of the magnetic plate 12 is arranged to face the outer circumference of the moving core 10 and is exposed from the inner circumferences of the coil bobbin 6 and the housing 9.

The stator core 13 is made of ferromagnetic material and into a cylindrical shape, and is insert-molded between the outer circumference of the piece 7 and the inner circumference of the coil bobbin 6. Axial front end portion of the stator core 13 mechanically fixes the inner circumference of the annular portion 62. The axial length of the stator core 13 is so sized that the stator core 13 may be positioned closer to the axial center of the coil bobbin 6, i.e., to the axial center of the coil 5, more than the flange 42.

Next, a method of manufacturing the fluid controlling electromagnetic valve 1 of the present embodiment will be described with reference to FIGS. 1–3.

Using an injection molding machine (resin injection means) (not illustrated), a primary molding is performed (at a primary molding step) by injecting a molding resin such as the polybutylene terephthalate (PBT) into a first mold for forming the coil bobbin 6. By this, the coil bobbin 6 is integrally resin-molded to have the shape shown in FIG. 2. That is, in the coil bobbin 6, both axial end portions of the cylindrical guide portion 40 have the flanges 41, 42 having the convex and concave joints 43, 44.

Next, a conductive wire is wound by a predetermined number of turns around the outer circumference of the guide portion 40 of the coil bobbin 6, to form the coil 5. The lead wires at both ends of the coil 5 and the paired terminals 65 are electrically connected. Next, the annular portion 62 of the yoke 11 is crimped to the axial front end portion of the stator core 13 to sandwich and assemble the flanges 41 and 42, between front end face of the magnetic plate 12 and the other end face of the annular portion 62 (assembling step).

Using an injection molding machine (resin injection means), the molding resin such as the polybutylene terephthalate (PBT) is injected from the resin injection port of a second mold for forming the housing 9 into the mold, to perform a second molding including the piece 7 (secondary molding step). Thereby, the housing 9 is integrally resin-molded, as shown in FIG. 2.

Here, the molding resin (including the cylindrical side wall 52 and the side wall portion 45) is insert-molded with the coil 5, the lead wires at both ends of the coil 5, the portions of the paired terminals 65, the coil bobbin 6, the yoke 11, the magnetic plate 12 and the stator core 13. Here, the magnetic plate 12 is so sandwiched between the flange 42 and the annular plate 58 that its inner circumference is exposed from the inner circumferences of the coil bobbin 6 and the housing 9.

An operation of the fluid controlling electromagnetic valve 1 in the present embodiment will be described with reference to FIGS. 1–3.

When the coil 5 of the fluid controlling electromagnetic valve 1 is energized, the coil 5 generates the magnetomotive force to magnetize the moving core 10, the yoke 11, the magnetic plate 12 and the stator core 13. The moving core 10 is attracted toward the stator core 13 so that the valve member 4 integrated with the leaf spring 38 moves frontwardly against the urging force of the return spring 8.

As a result, the valve member 4 leaves the valve seat 3, thereby opening the valve port 25. Therefore, the evaporated fuel in the canister 102 flows through the pipeline 105 into the fluid controlling electromagnetic valve 1. Then, the evaporated fuel flows in the passage of the inlet port 21→the inlet passage 22→the filter 14→the chamber 23→the fluid passage 24→the valve port 25→the fluid passage 26→the outlet passage 27→the outlet port 28 into the intake pipe 103, and the fuel is introduced into the engine.

As described above, after the primary molding of the coil bobbin 6, the magnetic plate 12 is arranged by resin-molding integrally with the housing 9. That is, since the magnetic plate 12 is not resin-molded integrally with the coil bobbin 6, the magnetic plate 12 and the coil bobbin 6 are arranged close to each other without any molding resin being in the side gap (SG) between the inner circumference of the magnetic plate 12 and the outer circumference of the moving core 10.

Further, the moving core 10 is disposed close to the axial center of the coil 5, thereby axially and partially attaining the overlapping portion between the coil 5 and the moving core 10. Thus, the moving core 10 is rapidly magnetized when the coil 5 is energized. Since, the magnetization efficiency is improved, the moving core 10 quickly moves. In other words, the axial size of the fluid controlling electromagnetic valve 1 itself is reduced while improving a responsibility, thereby providing an effect to realize the axial size reduction of the fluid controlling electromagnetic valve 1 easily.

Further, the piece 7 for regulating the axial displacement of the valve member 4 and the housing 9, which encloses and holds the coil 5, the coil bobbin 6, the magnetic plate 12, and the stator core 13, are integrally resin-molded. As a result, axial positions of the leading end face of the regulating portion (leading end on the valve member side) 47 of the piece 7 and the fitting face 56 of the fitting portion 55 of the housing 9 are highly precisely determined.

The position of the fitted face 36 of the fitted portion 35 of the seat valve 2 to be fitted on the fitting face 56 of the fitting portion 55 of the housing 9 and the position of the value seat 3 are precisely determined. Thereby, an axial distance between the valve member 4 held through the leaf spring 38 by the packing 39, as sandwiched between the protrusion 58 formed at the inner circumference of the fitting portion 55 of the housing 9, and the regulating portion 47 of the piece 7 are precisely determined. As a result, the number of parts is reduced while attaining highly precisely the axial distance between the front end face of the valve member 4 and the regulating portion (valve member side leading end) 47 of the piece 7, and the air gap portion (AG) or the axial distance between the axial front end face of the moving core 10 and the axial rear end face of the stator core 13.

(Second Embodiment)

Figure 4:
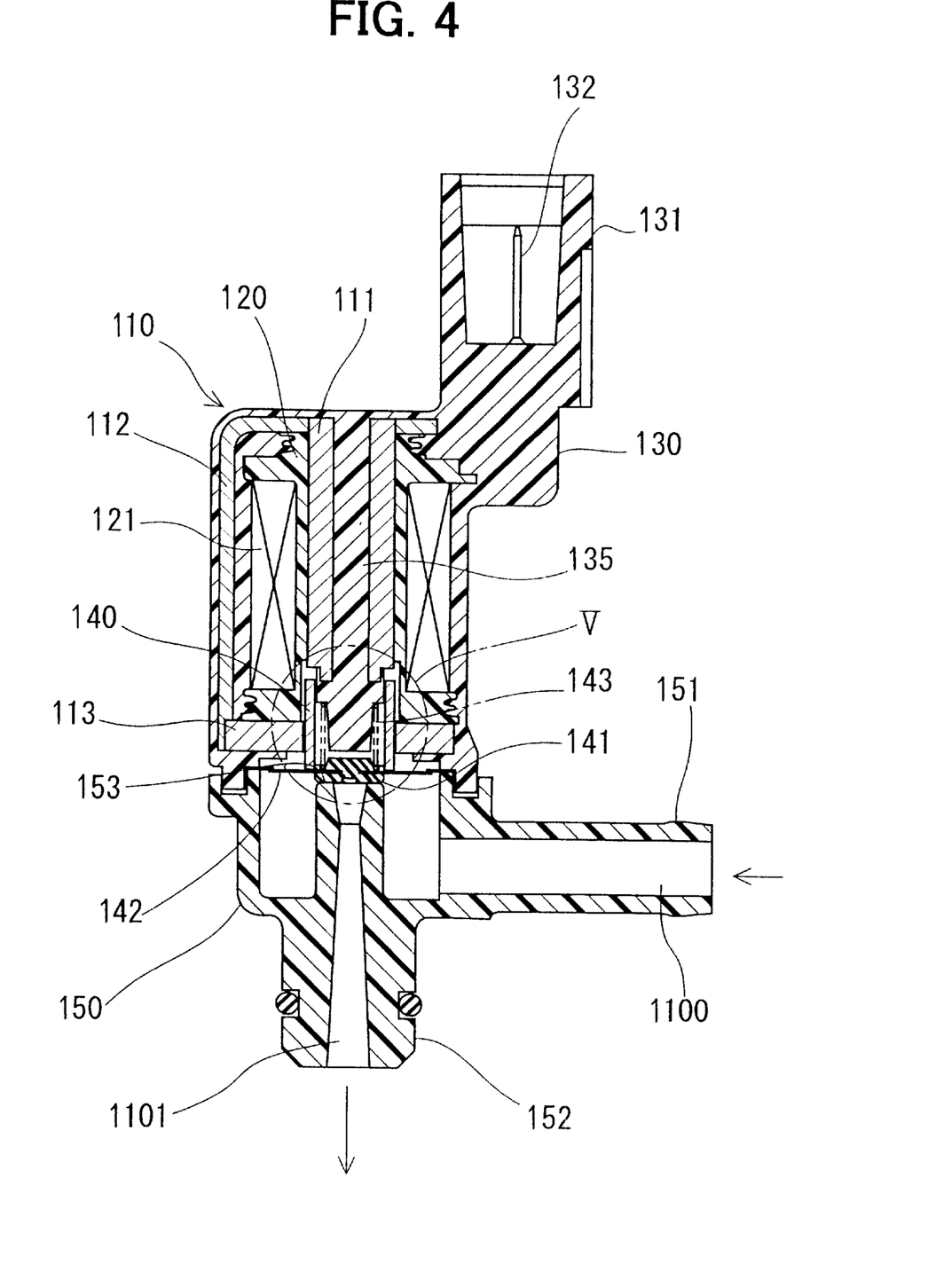
FIG. 4 is a cross-sectional view showing an electromagnetic valve device (second embodiment)
Figure 5:
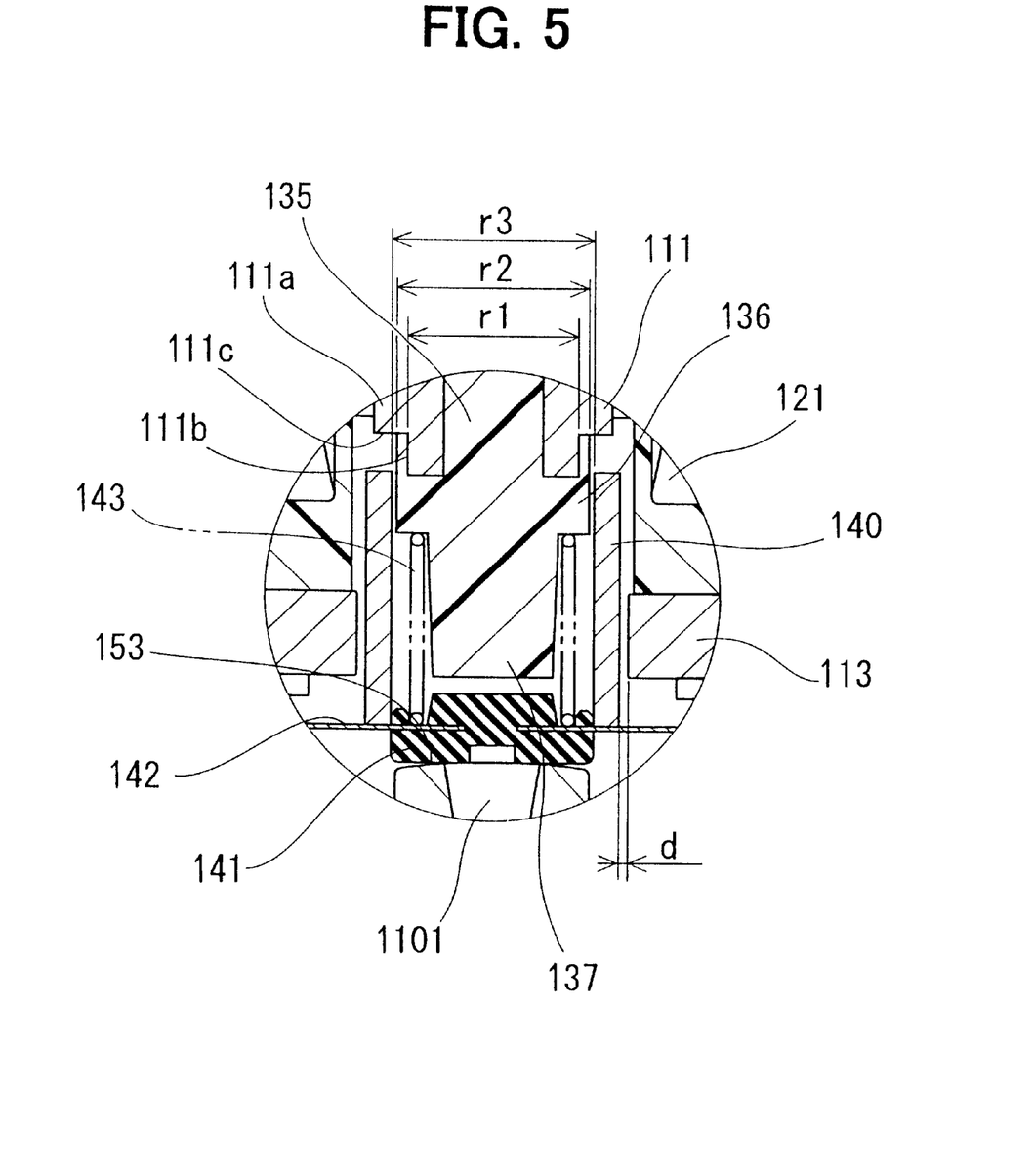
FIG. 5 is an enlarged view showing a portion denoted by line V in FIG. 4 (second embodiment)

An electromagnetic valve device according in the second embodiment is shown in FIGS. 4 and 5. The electromagnetic valve device 110 is a valve device used in a system for feeding out an evaporated fuel, as evaporated from the fuel tank of a vehicle, to the engine. This device opens and closes the passage of the evaporated fuel.

A stator core 111 as a first stator core of the electromagnetic valve device 110 is formed into a cylindrical shape. A yoke 112 is mechanically fixed to one end of the stator core 111. A core plate 113 as a second stator core is connected to the yoke 112 on the other end side of the stator core 111. The stator core 111, the yoke 112 and the core plate 113 are made of a magnetic material. A bobbin 120 having a coil 121 wound thereon is so arranged on the outer circumference of the stator core 111 that it is sandwiched between the yoke 112 and the core plate 113. A coil unit includes the bobbin 120 and the coil 121.

A filling resin 130 insert-molds the stator core 111, the yoke 112, the core plate 113, the bobbin 120 and the coil 121. The filling resin 130 further molds a connector 131 and a guide member 135. Terminals 132 are buried in the connector 131 and are electrically connected with the coil 121. The guide member 135 is molded to fill the inside of the stator core 111 and to protrude toward a valve member 141. The guide member 135 guides the inner circumference wall of a moving core 140 reciprocally.

The moving core 140, the valve member 141 and a leaf spring 142 form a movable member so that they move integrally altogether. The moving core 140 is made of magnetic material and formed in a cylindrical shape, and is disposed at the inner circumference of the core plate 113. The moving core, 140 is fixed to the disc-shaped leaf spring 142 by welding, for example. The valve member 141 is made of rubber and is fitted to the leaf spring 142. This leaf spring 142 is sandwiched at the outer circumference thereof between the filling resin 130 and a fluid passage member 150. A coil spring 143 abuts at its one end on the leaf spring 142 and at its other end on the guide member 135. The coil spring 143 urges the leaf spring 142 toward a valve seat 153 formed within the fluid passage member 150.

The fluid passage member 150 is jointed to the filling resin 130. In the fluid passage member 150, an inlet port 151 and an outlet port 152 are integrally formed. When the valve member 141 leaves the valve seat 153, the fluid having flown from an inlet passage 1100 of the inlet port 151 is discharged from an outlet passage 1101 of the outlet port 152. The inlet passage 1100 and the outlet passage 1101 form a "fluid passage" defined in the present invention.

As shown in FIG. 5, the end portion of the stator core 111 at the side of the valve member 141 has: a large diameter portion 111a; and a small diameter portion 111b arranged at the side closer to the valve member 141 than the large diameter portion 111a and having a smaller diameter than that of the large diameter portion 111a. A step 111c is formed between the large diameter portion 111a and the small diameter portion 111b. The guide member 135 has: a guide portion 136 having a diameter smaller than that of the large diametrically larger portion 111a but larger than that of the diameter portion 111b; and a stopper 137 protruding from the guide portion 136 toward the valve member 141 and having a smaller diameter than that of the guide portion 136. The guide portion 136 covers the outer circumference of the diametrically smaller portion 111b. The stopper 137 retains the valve member 141 when the moving core 140 is attracted toward the first stator core 111, to regulate the displacements of the moving core 140 and the valve member 141. When the diametrically smaller portion 111b has an external diameter r1, the guide portion 136 has an external diameter r2, and the moving core 140 has an internal diameter r3, relations of r3>r2>r1 exists.

Here will be described the procedure for manufacturing the electromagnetic valve device 110.

(1) The yoke 112 is mechanically fixed to one end of the stator core 111.

(2) The bobbin 120 having the coil 121 wound thereon is inserted into the gap between the outer circumference of the stator core 111 and the inner circumference of the yoke 112.

(3) The core plate 113 is connected to the yoke 112 on the other end side of the stator core 111.

(4) A molding member for the moving core 140 is positioned for assembling the moving core 140 after filling the resin.

(5) The stator core 111, the yoke 112, the core plate 113, the bobbin 120 having the coil 121 wound thereon, and the molding member are insert-molded of resin. At this time, the guide member 135 is resin-molded.

(6) The molding member is removed to assemble the moving core 140.

The structure assembled described above is assembled with the fluid passage member 150 and remaining members to manufacture the electromagnetic valve device 110.

Here will be described an operation of the electromagnetic valve device 110.

(1) When the coil 121 is not energized, the valve member 141 is seated on the valve seat 153 by the urging force of the coil spring 143. Therefore, the communication between the inlet passage 1100 and the outlet passage 1101 is shut off, so that no fluid is discharged from the outlet passage 1101.

(2) When the coil 121 is energized, the moving core 140 is attracted toward the stator core 111 by the magnetic force generated by the coil 121. When the moving core 140 is attracted toward the stator core 111, the valve member 141 leaves the valve seat 153. As a result, the inlet passage 1100 communicates with the outlet passage 1101 to discharge the fluid from the outlet passage 1101. The movements of the moving core 140 and the valve member 141 are stopped when the valve member 141 is retained by the stopper 137 of the guide member 135.

When the moving core 140 moves toward the stator core 111 so that its inner circumference wall overlaps the outer circumference wall of the small diameter portion 111b, a magnetic attraction acts in the radial directions between the moving core 140 and the small diameter portion 111b. The magnetic attraction force to act axially between the moving core 140 and the stator core 111 gradually increases as the axial gap to be axially formed between the stator core 111 and the moving core 140 becomes smaller. Here, the axial gap means the distance between the moving core 140 and that portion of the stator core 111 facing the moving core 140 in the axial direction. In the second embodiment, the portion of the stator core 111 facing the moving core 140 axially is the step 111c.

Figure 6:
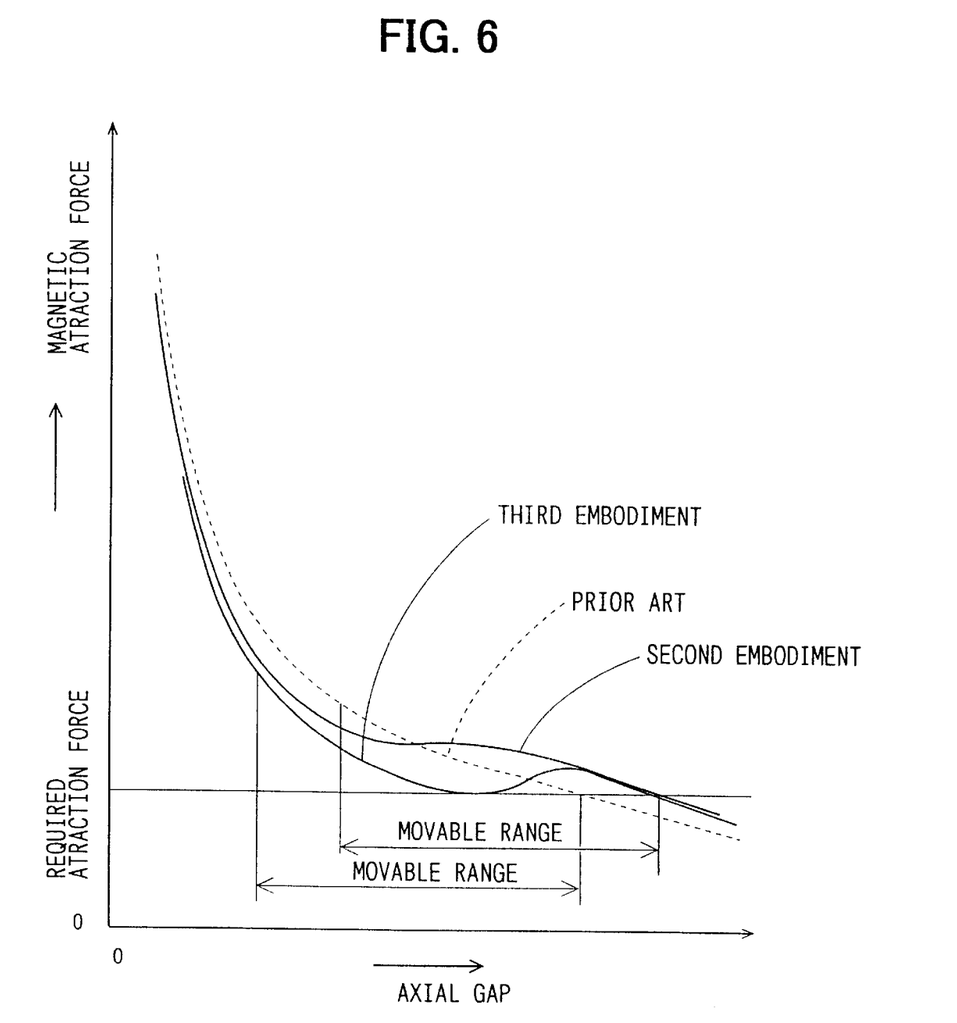
FIG. 6 is a graph showing relations between an axial gap and a magnetic attraction in the second embodiment, a third embodiment and prior art.

As the moving core 140 comes closer to the stator core 111 to reduce the axial gap, the facing area for the inner circumference wall of the moving core 140 and the outer circumference wall of the small diameter portion 111b to face radially increases to enlarge the magnetic attraction to act radially between the moving core 140 and the small diameter portion 111b. As shown in FIG. 6, therefore, the rise in the magnetic attraction to act axially is suppressed till the axial gap becomes small to some extent, thereby flattening the characteristics between the axial gap and the magnetic attraction.

Further, the guide portion 136 of the guide member 135 guides the inner circumference wall of the moving core 140 in a reciprocating manner. When the filling resin 130 is injected, therefore, it is unnecessary to cover the inner circumference wall of the core plate 113, as arranged around the outer circumference of the moving core 140, with a resin thereby guiding the outer circumference wall of the moving core 140. It is, therefore, possible to minimize the side gap d formed between the outer circumference wall of the moving core 140 and the inner circumference wall of the core plate 113. As the side gap d becomes smaller, the magnetic attraction becomes higher for the stator core 111 to attract the moving core 140.

As compared with the construction of the prior art in which the core plate 113 is covered at its inner circumference with the resin for guiding the outer circumference wall of the moving core 140, the magnetic attraction is higher when the axial gap is large, as shown in FIG. 6. Thus, the size of the axial gap for satisfying the minimum magnetic attraction for attracting the moving core 140 is larger than that of the prior art. By enlarging the axial gap (i.e., the maximum gap) when the coil 121 is deenergized and the axial gap (i.e., the minimum gap) when the valve member 141 collides against the stopper 137, the range having relatively flat characteristics is provided for the moving core 140 to move in the characteristic curve shown in FIG. 6. As a result, a velocity for the valve member 141 to collide against the stopper 137 lowers to reduce the bound of the valve member 141 to collide against the stopper 137. Therefore, where the valve opening time is so short as to reduce the flow rate of the fluid to be discharged from the inlet passage 1100 to the outlet passage 1101, it is possible to reduce the dispersion in the fluid flow rate. When the bound of the valve member 141 is short, moreover, it is possible to prevent the opening area of the passage from becoming small. Even at a low fluid flow rate, therefore, it is possible to retain the linear relation between the valve opening time and the fluid flow rate.

When the same axial gap as that of the prior art is provided, an equivalent magnetic attraction is established even with a smaller number of turns of the coil. When the number of coil turns is made as small as possible, therefore, it is possible to reduce the size of the electromagnetic valve device.

(Third Embodiment)

Figure 7:
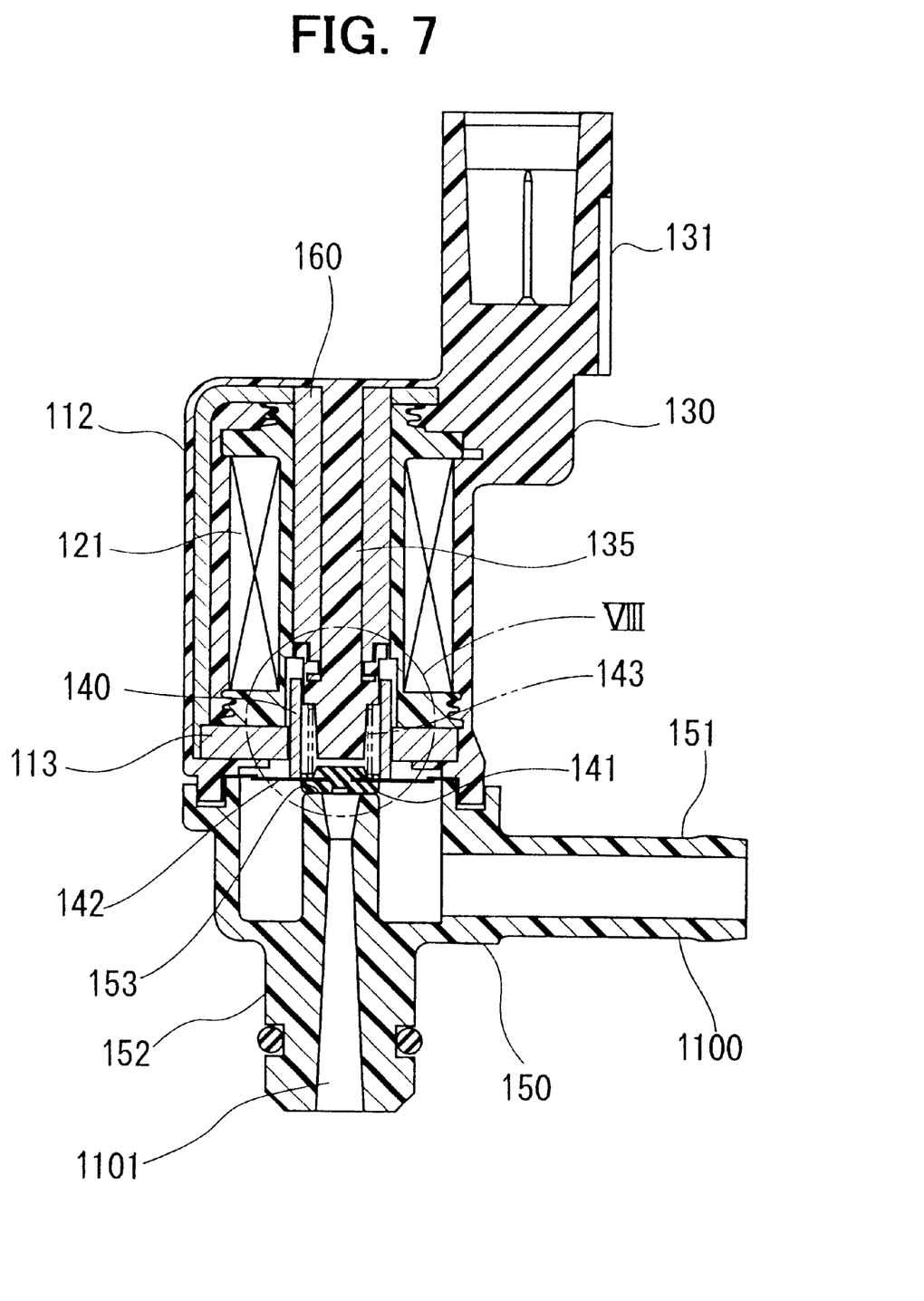
FIG. 7 is a cross-sectional view showing an electromagnetic valve device (third embodiment)
Figure 8:
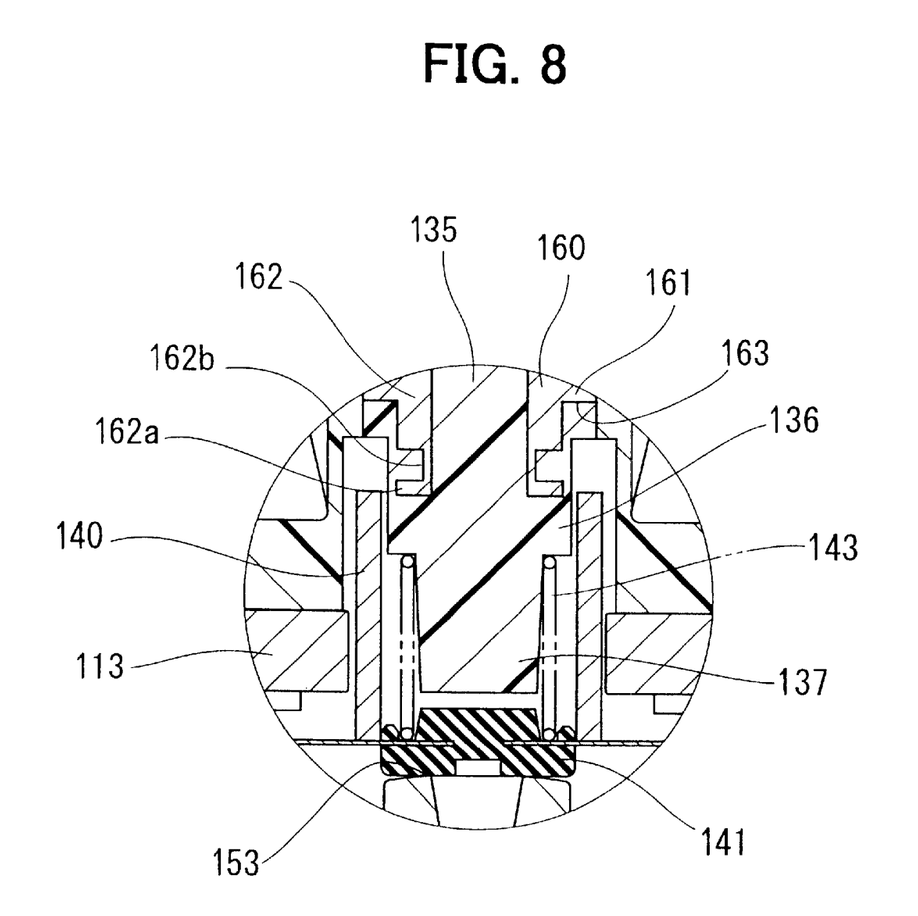
FIG. 8 is an enlarged view showing a portion denoted by line VIII in FIG. 7 (third embodiment)

A third embodiment of the present invention is shown in FIGS. 7 and 8.

The end portion of a stator core 160 as the first stator core of the third embodiment at the side of the valve member 141 includes: a larger diameter portion 161, and a small diameter portion 162 disposed closer to the valve member 141 than the large diameter portion 161 and having a smaller diameter than that of the large diameter portion 161. A step 163 is formed between the large diameter portion 161 and the small diameter portion 162. The small diameter portion 162 has a recess 162b which is arranged farther away from the moving core 140 than its leading end portion 162a at the side of the moving core 140 and which has a smaller diameter than that of the leading end portion 162a.

When the moving core 140 moves toward the stator core 160 so far that its inner circumference wall overlaps the outer circumference wall of the leading end portion 162a of the small diameter portion 162, the magnetic attraction acts in the radial directions between the moving core 140 and the leading end portion 162a. When the moving core 140 is further attracted toward the first stator core 160 so that its leading end portion at the side of the large diameter portion passes the leading end portion 162a, the magnetic attraction acts between the leading end portion of the moving core 140 and the leading end portion 162a of the stator core 160 backwardly in the direction in which the moving core 140 is attracted toward the stator core 160. As shown in FIG. 6, therefore, the magnetic attraction to act axially between the stator core 160 and the moving core 140 when the valve member 141 collides against the stopper 137 lowers the velocity at which the valve member 141 collides against the stopper 137. This reduces the bound for the valve member 141 to collide against the stopper 137. The axial gap of the third embodiment means an axial gap to be formed between the step 163 and the moving core 140.

(Fourth Embodiment)

Figure 9:
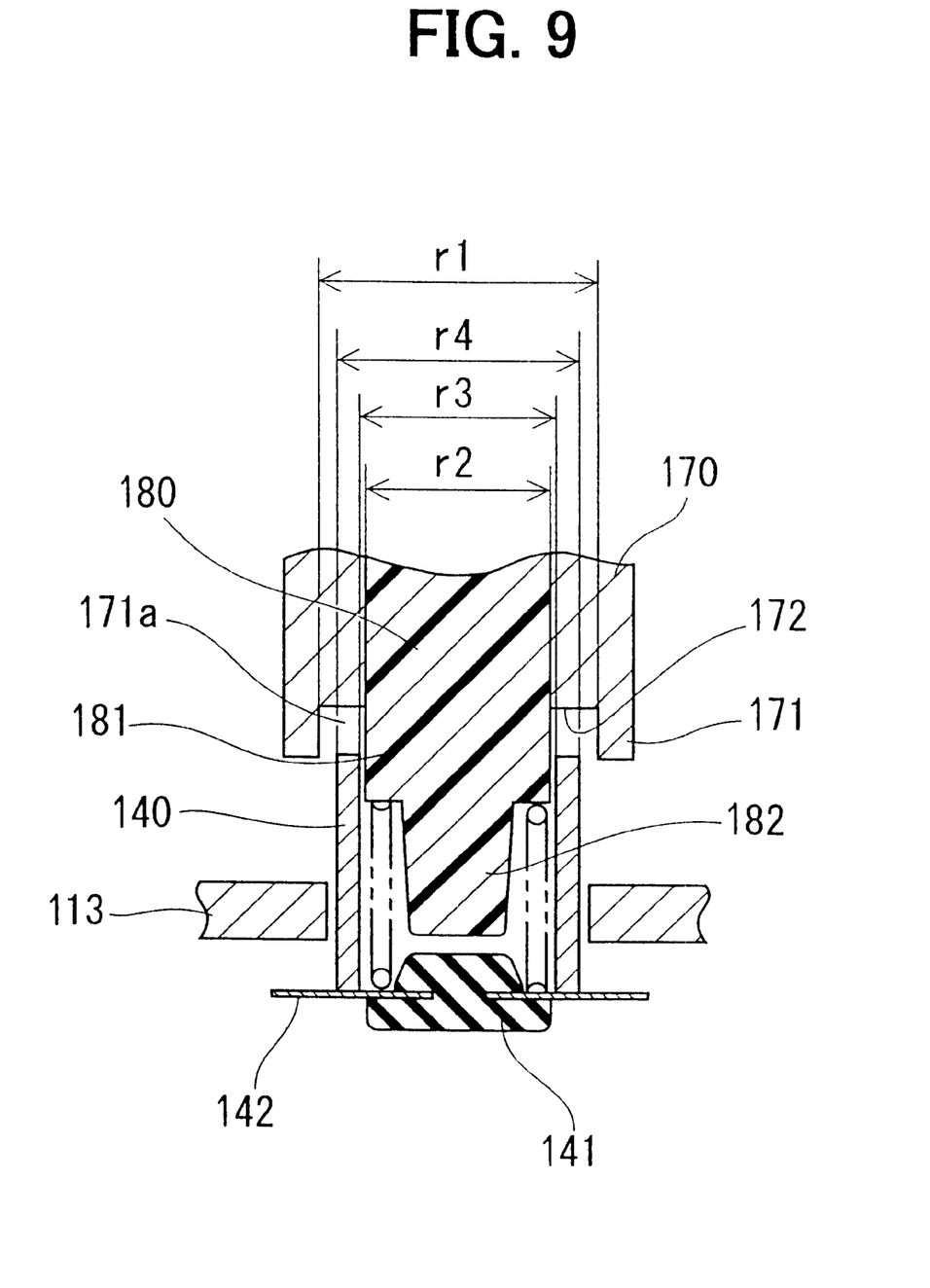
FIG. 9 is a cross-sectional view showing an electromagnetic valve device (fourth embodiment).

A fourth embodiment of the present invention is shown in FIG. 9.

A stator core 170 as the first stator core has an accommodation portion 171 formed at the valve member 141 side end thereof for forming a space 171a into which the moving core 140 is introduced. A guide member 180 has: a guide portion 181 filling the inner circumference side of the stationary core 170 for guiding the inner circumference wall of the moving core 140 reciprocally, and a stopper 182 protruding more toward the valve member 141 than the guide portion 181. The stopper 182 is diametrically smaller than the guide portion 181. When the accommodation portion 171 has an internal diameter r1, the guide portion 181 has an external diameter r2, the moving core 140 has an internal diameter r3 and the moving core 140 has an external diameter r4, relations of r1>r4>r3>r2 exists.

When the moving core 140 moves so far toward the stator core 170 that its outer circumference wall overlaps the inner circumference wall of the accommodation portion 171, the magnetic attraction acts radially between the moving core 140 and the accommodation portion 171. When the moving core 140 is further attracted toward the stator core 170, a higher magnetic attraction acts radially between the moving core 140 and the accommodation portion 171. Till the axial gap becomes smaller to some extent, therefore, the rise in the magnetic attraction to act axially is suppressed to flatten the characteristics between the axial gap and the magnetic attraction. The axial gap in the fourth embodiment means an axial gap to be formed between the bottom face 172 of the accommodation portion 171 and the moving core 140.

In addition to the construction of the fourth embodiment, a recess having a larger internal diameter than that of the leading end portion of the accommodation 171 at the side of the valve member 141 may be formed in the accommodation portion 171 on the backside of the moving core. When the moving core 140 is attracted toward the stator core 170 so that its leading end at the side of the stator core 170 passes the leading end portion of the accommodation portion 171, the magnetic attraction acts between the leading end portion of the moving core 140 and the leading end portion of the accommodation portion 171 backward of the direction in which the moving core 140 is axially attracted toward the stator core 170. Therefore, the magnetic attraction to act axially between the stator core 170 and the moving core 140 when the valve member 141 collides against the stopper 182 lowers the velocity at which the valve member 141 collides against the stopper 182. This reduces the bound for the valve member 141 to collide against the stopper 182.

(Modifications)

In the above described embodiments, the inner circumference wall of the moving core is guided in the reciprocating manner by the guide member which is integrally resin-molded when the stator core, the core plate and the coil unit are insert-molded. Therefore, it is unnecessary to provide the guide member for guiding the moving core reciprocally in the inner circumference of the core plate disposed at the outer circumference of the moving core. The side gap to be radially formed between the moving core and the core plate is minimized to strengthen the magnetic attraction for attracting the moving core toward the stator core facing the moving core axially. Therefore, the number of turns of the coil is decreased to reduce the size of the electromagnetic valve device.

By increasing the magnetic attraction, the magnetic attraction required for attracting the moving core toward the stator core is obtained, even when the axial gap formed axially between the stator core and the moving core is enlarged when the coil 21 is deenergized. The axial gap and the magnetic attraction to act between the stator core and the moving core abruptly increase as the moving core approaches the stator core. Therefore, in the above-described embodiments, the relatively flat portions of the characteristics between the axial gap and the magnetic attraction to act axially between the stator core and the moving core is employed by shifting the range of the axial gap to being used to a larger side. Further, as the moving core comes closer to the stator core, the force to attract the moving core radially acts between the moving core and the stator core. Thus, it is possible to suppress the increase in the magnetic attraction to attract the moving core axially as the moving core comes close to the stator core.

Therefore, the velocity for the movable member colliding against the stopper is lowered to reduce the bound of the movable member. As a result, the dispersion of the fluid flow rate is reduced even when the valve opening time is so short as to reduce the flow rate of the fluid to be discharged through the inlet passage 1100 from the outlet passage 1101. As the bound of the valve member 141 becomes short, moreover, it is possible to prevent the reduction in the opening area of the passages. Even at a small fluid flow rate, therefore, it is possible to keep the linear relation between the valve opening time and the fluid flow rate.

In the above-described embodiments, the guide member has the stopper. Alternatively, the guide member and the stopper may be separate members. Further, the filling resin 130 having the connector 131 and the guide member are integrally molded. Alternatively, the guide member may be made separate of the connector 131.

In the above-described embodiments, the fluid controlling electromagnetic valve is used in the evaporated fuel evapotranspiration preventing system for a vehicle. Alternatively, the fluid controlling electromagnetic valve may be used in the accessories or air conditioners to be mounted on the vehicle. The control fluid should not be limited to the air but may use a gas such as a gas-phase coolant, a liquid such as water or a liquid-phase coolant, or a fluid in a two gas-liquid phase.

In the above-described embodiments, the fluid controlling electromagnetic valve is embodied by the normally closed electromagnetic ON/OFF valve. Alternatively, it may be exemplified by a normally open type electromagnetic ON/OFF valve. Further, as the voltage value or current value to the coil is increased more, the lift of the valve member from the valve seat may become the more or less.

What is claimed is:

1. An electromagnetic valve comprising:
   a coil for generating a magnetic force when said coil is energized;
   a coil bobbin made of resin, around which said coil is wound;
   an annular magnetic member magnetized by the magnetic force generated by said coil;
   a stator core fitted in an inner circumference of said coil bobbin and magnetized by the magnetic force generated by said coil;
   a housing made of resin, said housing formed separately from said coil bobbin for holding and fixing said magnetic member at one axial end face of said coil bobbin such that an inner circumference of said magnetic member is exposed, and for holding and fixing said stator core in the inner circumference of said coil bobbin; and
   a moving core arranged to face one axial end face of said stator core while providing an axial air gap therebetween, said moving core arranged in the inner circumference of said magnetic member while providing a radial side gap therebetween, said moving core attracted toward said stator core by the magnetic force generated by said coil;
   wherein the moving core directly faces the inner circumference of the magnetic member via the radial side gap.

2. An electromagnetic valve according to claim 1, wherein said stator core defines one end portion for forming the axial air gap between the stator core and said moving core, and
   the one end portion of said stator core and one axial portion of said moving core are arranged close to an axial center of said coil bobbin.

3. An electromagnetic valve according to claim 1, wherein terminal wires of each end of said coil are both electrically connected to an external connection terminal, and
   said terminal wires of said coil and said external connection terminal are insert-molded in said housing, the housing being integrally resin-molded.

4. An electromagnetic valve according to claim 1, wherein said coil, said coil bobbin, said magnetic member and said stator core are insert-molded in said housing, the housing being integrally resin-molded.

5. An electromagnetic valve according to claim 1, further comprising:
   a valve seat formed at an open end of a fluid passage formed in said electromagnetic valve; and
   a valve member axially moving integrally with said moving core for being seated on and leaving said valve seat, wherein
   said housing includes a regulating member integrally resin-molded, and
   said regulating member is arranged to face said valve seat for regulating an amount of movement of said valve member in an axial direction.

6. An electromagnetic valve according to claim 1, wherein said magnetic member is formed separately from said coil bobbin.

7. A method for manufacturing an electromagnetic valve, said electromagnetic valve including a coil for generating a magnetic force when said coil is energized, a coil bobbin made of resin, around which said coil is wound, an annular magnetic member magnetized by the magnetic force generated by said coil,
   a stator core fitted in an inner circumference of said coil bobbin and magnetized by the magnetic force generated by said coil, a housing made of resin, said housing formed separately from said coil bobbin for holding and fixing said magnetic member at one axial end face of said coil bobbin such that an inner circumference of said magnetic member is exposed, and for holding and fixing said stator core in the inner circumference of said coil bobbin, and a moving core arranged to face one axial end face of said stator core while providing an axial air gap therebetween, said moving core arranged in the inner circumference of said magnetic member while providing a radial side gap therebetween, said moving core attracted toward said stator core by the magnetic force generated by said coil, comprising the steps of:
   forming said coil bobbin by injecting the resin into a first mold;
   forming said coil by winding a conductive wire around said coil bobbin; and
   electrically connecting lead wires of said coil to a terminal;
   assembling said magnetic member to said coil bobbin before forming said housing by injecting the resin into a second mold.

8. An electromagnetic valve device comprising:
   a coil unit including a bobbin and a coil wound around said bobbin;
   a movable member including a moving core formed in a cylindrical shape and moving reciprocally for opening and closing a fluid passage;
   a first stator core facing said moving core in a reciprocating direction of said moving core, said first stator core attracting said moving core by a magnetic force generated by energizing said coil;
   a second stator core facing an outer circumference wall of said moving core and forming a magnetic circuit together with said moving core and said first stator core; and
   a guide member arranged at a side of said first stator core facing said moving core and made of nonmagnetic material for guiding an inner circumference wall of said moving core reciprocally.

9. An electromagnetic valve device according to claim 8, wherein said guide member retains said movable member moving toward said first stator core, at a predetermined displacement.

10. An electromagnetic valve device according to claim 8, wherein said guide member is molded by a resin material which insert-molds said first stator core, said second stator core and said coil unit.

11. An electromagnetic valve device according to claim 8, wherein
an end portion of said first stator core, facing said moving core, includes a large diameter portion, and a small diameter portion arranged at said moving core side of said large diameter portion and having an external diameter smaller than an external diameter of said large diameter portion, and
when said the external diameter of said small diameter portion is r1, an external diameter of said guide member is r2, and an internal diameter of said moving core is r3, a relation of r3>r2>r1 exists.

12. An electromagnetic valve device according to claim 11, wherein
said small diameter portion defines a leading end portion,
a recess is formed within said leading end portion, and
said recess has a diameter smaller than a diameter of said leading end portion.

13. An electromagnetic valve device according to claim 8, wherein
an end portion of said first stator core, facing said moving core, includes an accommodation portion forming a space into which said moving is introduced, and
when said accommodation portion has an internal diameter r1, said guide member has an external diameter r2, said moving core has an internal diameter r3, and said moving core has an external diameter r4, a relation of r1>r4>r3>r2 exists.

14. An electromagnetic valve device according to claim 13, wherein
said accommodation portion includes a leading end portion,
a recess is formed within said leading end portion, and
said recess has an internal diameter larger than an internal diameter of said leading end portion.

15. A method for manufacturing an electromagnetic valve device, said electromagnetic valve device including a coil unit including a bobbin and a coil wound around said bobbin, a movable member including a moving core formed in a cylindrical shape and moving reciprocally for opening and closing a fluid passage, a first stator core facing said moving core in a reciprocating direction of said moving core, said first stator core attracting said moving core by a magnetic force generated by energizing said coil, a second stator core facing an outer circumference wall of said moving core and forming a magnetic circuit together with said moving core and said first stator core, and a guide member arranged at a side of said first stator core facing said moving core and made of nonmagnetic material for guiding an inner circumference wall of said moving core reciprocally, comprising the steps of:
fitting said coil to an outer circumference of said first stator core;
arranging said second stator core at the moving core side of said coil unit;
positioning a molding member for forming said moving core;
forming said guide member of a resin material for insert-molding said first stator core, said second stator core, said coil unit and said molding member; and
removing said molding member and assembling said moving core.

16. An electromagnetic valve device manufacturing method according to claim 15, wherein
said guide member works as a stopper for regulating a displacement amount of said movable member toward said first stator core.

17. An electromagnetic valve comprising:
a coil for generating a magnetic force when said coil is energized;
a coil bobbin made of resin, around which said coil is wound;
an annular magnetic member magnetized by the magnetic force generated by said coil;
a stator core fitted in an inner circumference of said coil bobbin and magnetized by the magnetic force generated by said coil;
a housing made of resin, said housing formed separately from said coil bobbin for holding and fixing said magnetic member at one axial end face of said coil bobbin such that an inner circumference of said magnetic member is exposed, and for holding and fixing said stator core in the inner circumference of said coil bobbin; and
a moving core arranged to face one axial end face of said stator core while providing an axial air gap therebetween, said moving core arranged in the inner circumference of said magnetic member while providing a radial side gap therebetween, said moving core attracted toward said stator core by the magnetic force generated by said coil;
wherein terminal wires of each end of said coil are both electrically connected to an external connection terminal, and
said terminal wires of said coil and said external connection terminal are insert-molded in said housing, the housing being integrally resin-molded.

18. An electromagnetic valve comprising:
a coil for generating a magnetic force when said coil is energized;
a coil bobbin made of resin, around which said coil is wound;
an annular magnetic member magnetized by the magnetic force generated by said coil;
a stator core fitted in an inner circumference of said coil bobbin and magnetized by the magnetic force generated by said coil;
a housing made of resin, said housing formed separately from said coil bobbin for holding and fixing said magnetic member at one axial end face of said coil bobbin such that an inner circumference of said magnetic member is exposed, and for holding and fixing said stator core in the inner circumference of said coil bobbin; and
a moving core arranged to face one axial end face of said stator core while providing an axial air gap therebetween, said moving core arranged in the inner circumference of said magnetic member while providing a radial side gap therebetween, said moving core attracted toward said stator core by the magnetic force generated by said coil;
wherein said coil, said coil bobbin, said magnetic member and said stator core are insert-molded in said housing, the housing being integrally resin-molded.

19. An electromagnetic valve comprising:
a coil for generating a magnetic force when said coil is energized;

a coil bobbin made of resin, around which said coil is wound;

an annular magnetic member magnetized by the magnetic force generated by said coil;

a stator core fitted in an inner circumference of said coil bobbin and magnetized by the magnetic force generated by said coil;

a housing made of resin, said housing formed separately from said coil bobbin for holding and fixing said magnetic member at one axial end face of said coil bobbin such that an inner circumference of said magnetic member is exposed, and for holding and fixing said stator core in the inner circumference of said coil bobbin;

a moving core arranged to face one axial end face of said stator core while providing an axial air gap therebetween, said moving core arranged in the inner circumference of said magnetic member while providing a radial side gap therebetween, said moving core attracted toward said stator core by the magnetic force generated by said coil;

a valve seat formed at an open end of a fluid passage formed in said electromagnetic valve; and a valve member axially moving integrally with said moving core for being seated on and leaving said valve seat, wherein said housing includes a regulating member integrally resin-molded, and said regulating member is arranged to face said valve seat for regulating an amount of movement of said valve member in an axial direction.

* * * * *